United States Patent
Li et al.

(10) Patent No.: US 10,701,651 B2
(45) Date of Patent: Jun. 30, 2020

(54) INFORMATION TRANSMISSION METHOD, BASE STATION AND TERMINAL

(71) Applicant: YULONG COMPUTER TELECOMMUNICATION SCIENTIFIC (SHENZHEN) CO., LTD., Shenzhen, Guangdong (CN)

(72) Inventors: Mingju Li, Guangdong (CN); Yajun Zhu, Guangdong (CN); Yunfei Zhang, Guangdong (CN)

(73) Assignee: YULONG COMPUTER TELECOMMUNICATION SCIENTIFIC (SHENZHEN) CO., LTD. (CN), Shenzhen (CN)

(*) Notice: Subject to any disclaimer, the term of this patent is extended or adjusted under 35 U.S.C. 154(b) by 0 days.

(21) Appl. No.: 16/326,566

(22) PCT Filed: Nov. 24, 2017

(86) PCT No.: PCT/CN2017/112854
§ 371 (c)(1),
(2) Date: Apr. 22, 2019

(87) PCT Pub. No.: WO2018/099330
PCT Pub. Date: Jun. 7, 2018

(65) Prior Publication Data
US 2019/0261297 A1    Aug. 22, 2019

(30) Foreign Application Priority Data
Nov. 30, 2016    (CN) .......................... 2016 1 1092653

(51) Int. Cl.
*H04W 56/00* (2009.01)
*H04L 27/26* (2006.01)
*H04L 5/00* (2006.01)

(52) U.S. Cl.
CPC ....... *H04W 56/0015* (2013.01); *H04L 5/0023* (2013.01); *H04L 5/0048* (2013.01);
(Continued)

(58) Field of Classification Search
CPC .............. H04L 5/0048; H04L 27/2662; H04L 27/2666; H04L 27/2675; H04W 54/001
See application file for complete search history.

(56) References Cited

U.S. PATENT DOCUMENTS 5,806,001 A     9/1998  Yokota
2006/0111149 A1  5/2006  Chitrapu et al.
(Continued)

FOREIGN PATENT DOCUMENTS

CN    1158547 A      9/1997
CN    102547968 A    7/2012
(Continued)

OTHER PUBLICATIONS

International Search Report issued in corresponding International Application No. PCT/CN2017/112854 with English Translation, dated Feb. 12, 2018, 6 pages.
(Continued)

*Primary Examiner* — David S Huang
(74) *Attorney, Agent, or Firm* — Bayes PLLC

(57) ABSTRACT

An information transmission method, a base station, and a terminal are disclosed herein. As an example, the method includes selecting, through a base station, one subcarrier spacing from at least one preset subcarrier spacing for transmitting a synchronization signal and a physical broadcast channel according to service delay requirements; configuring a transmitting time number of a beam if the base station uses the beam to transmit the synchronization signal and the physical broadcast channel, the transmitting time number being used to indicate a corresponding transmitting
(Continued)

time position of the beam in a pre-stored transmittable time zone for the synchronization signal and the physical broadcast channel; and sending information related to the transmitting time number to a terminal, for the terminal to determine a subframe boundary and complete time domain synchronization according to the information related to the transmitting time number and the pre-stored transmittable time zone.

12 Claims, 3 Drawing Sheets

(52) U.S. Cl.
CPC .......... *H04L 5/0053* (2013.01); *H04L 5/0094* (2013.01); *H04L 27/2662* (2013.01); *H04L 27/2666* (2013.01); *H04L 27/2675* (2013.01); *H04L 27/2692* (2013.01); *H04W 56/001* (2013.01); *H04W 56/004* (2013.01); *H04W 56/0045* (2013.01)

(56) References Cited

U.S. PATENT DOCUMENTS

| | | | |
|---|---|---|---|
| 2008/0089282 A1* | 4/2008 | Malladi | H04J 11/0069 370/329 |
| 2013/0064239 A1 | 3/2013 | Yu et al. | |
| 2014/0120926 A1 | 5/2014 | Shin et al. | |
| 2016/0308637 A1 | 10/2016 | Frenne et al. | |
| 2017/0929139 | 7/2017 | Kim | |
| 2018/0097672 A1* | 4/2018 | Jung | H04W 74/004 |
| 2019/0149384 A1* | 5/2019 | Kim | H04L 27/2666 370/328 |
| 2019/0159265 A1* | 5/2019 | Takeda | H04W 28/06 |
| 2019/0166569 A1* | 5/2019 | Wu | H04J 11/0069 |

FOREIGN PATENT DOCUMENTS

| | | |
|---|---|---|
| CN | 103748801 A | 4/2014 |
| CN | 104219757 A | 12/2014 |
| CN | 104734760 A | 6/2015 |
| CN | 106455040 A | 2/2017 |

OTHER PUBLICATIONS

Written Opinion of the International Searching Authority issued in corresponding International Application No. PCT/CN2017/112854 with English Translation, dated Feb. 12, 2018, 8 pages.
First Office Action issued in corresponding Chinese Application No. 21611092653.2, dated Mar. 27, 2019, 9 pages.
Extended European Search Report issued in corresponding European Application No. EP 17 87 6556, dated Oct. 1, 2019, 20 pages.
Coolpad: "Discussion on the design for synchronization signal", 3GPP TSG RAN WG1 Meeting #87, Reno, USA Nov. 14-18, 2016, R1-1612755, 3 pages.
Qualcomm Incorporated: "Multi-beam SYNC design", 3GPP TSG RAN WG1 Meeting #86b, Lisbon, Portugal, Oct. 10-14, 2016, R1-1610159, 9 pages.

\* cited by examiner

INFORMATION TRANSMISSION METHOD, BASE STATION AND TERMINAL

CROSS REFERENCE TO RELATED APPLICATIONS

This application is a national phase application of PCT application No. PCT/CN2017/112854 that claims priority of Chinese Patent Application No. 201611092653.2, filed on Nov. 30, 2016, both of which are incorporated herein by reference in their entirety.

TECHNICAL FIELD

The present disclosure relates to the technical field of telecommunication, and particularly relates to an information transmission method, a base station and a terminal.

BACKGROUND

Along with continuous development of user's telecommunication demands, people hope that their demands can be responded to and processed more quickly. Under the conventional LTE (Long Term Evolution) technology, the synchronization signal comprises PSS (Primary Synchronization Signal) and SSS (Secondary Synchronization Signal), both synchronization signals are of a cycle time of 5 ms and sent at subframe-0 and subframe-5, but in different symbols. PBCH (Physical Broadcast Channel) mainly transmits MIB (Master Information Block), in a way of periodical sending with a cycle time of 40 ms, and the MIB is send repeatedly for 4 times every 40 ms. The first time of sending happens in symbols 7, 8, 9, 10 of subframe-0 of a frame whose system frame number is a multiple of 4, the next three frames have their subframes-0 repeat the content sent in the first subframe-0. The content sent in the next 40 ms may be different from the content sent in its previous 40 ms. As for the frequency domain position, PSS/SSS and PBCH are both sent in the central 6 RBs (Resource Blocks), wherein the subcarrier spacing is 15 KHz, every RB has 12 subcarriers, and 6 RBs are 72 subcarriers. This way of transmitting synchronization signals and PBCH is very rigid and singular, which cannot fulfill the flexible and diversified delay requirements in different scenes of future 5G service, particularly, for some service that requires low delay, it especially cannot fulfill the demands. Therefore, it has been proposed to use different kinds of subcarrier spacing to perform service transmission for different service types, so as to fulfill demands of different services. As the service types are different, the subcarrier spacing settings for sending synchronization signals and PBCH during certain time of each carrier are different, so that the time lengths and bandwidths for sending synchronization signals and PBCH are different. Besides, under the circumstance of high-frequency section, the signal decay is relatively severe, which causes the cell coverage area to be relatively small. And in order to expand the coverage area, synchronization signals and PBCH can be sent on the basis of beams. If different beams use different time domain resources for transmission, then, in order to realize time domain synchronization, a terminal must know the exact position of the received beam in the time domain. However, when multiple beams exist, because each beam corresponds to a different position of transmission time in the time domain, the terminal only knows that the beam is in a time range of the time domain when the terminal receives the synchronization signals and PBCH sent on the beam. For example, three beams are used for sending synchronization signals and PBCH, each beam corresponds to a transmittable time position for signal, and three transmittable time positions compose a transmittable time zone, for instance, in the 14 symbols of a 1 ms subframe, the transmittable time zone corresponds to the symbol range of 6-11, each beam occupies two consecutive symbols, i.e., the first beam occupies symbol 6 and symbol 7 for transmission, the second beam occupies symbol 8 and symbol 9 for transmission, and the third beam occupies symbol 10 and symbol 11 for transmission. The sending time positions of the three beams in each base station relative to its own subframe boundary have been predefined, and the mapping table of the time-frequency domain sending position and the subcarrier spacing in relation to the carrier frequency have been predefined, the base station selects corresponding parameters for transmission according to the carrier frequency used by the base station, and the terminal determines the time domain subframe boundary according to the synchronization signals and PBCH detected by the terminal as well as the associated mapping table. When the terminal receives the synchronization signals and PBCH, if different beams are sent in different time domain and different directions, terminals in different locations would detect beams sent at different time, thus, if one terminal does not identify which beam it detects, the terminal will not identify which symbols in the symbol range the detected beam occupies, and will either not identify which relative position can be based on for determining the subframe boundary.

SUMMARY OF THE INVENTION

A technical problem to be solved by the embodiments of the present disclosure is how to provide an information transmission method, a base station and a terminal to make it convenient for a terminal to accurately carrying out time domain synchronization.

In order to solve the above technical problem, a first aspect of the embodiments of the present disclosure provides an information transmission method that comprises:

selecting, through a base station, one subcarrier spacing from at least one preset subcarrier spacing for transmitting a synchronization signal and a physical broadcast channel according to service delay requirements;

configuring a transmitting time number of a beam if the base station uses the beam to transmit the synchronization signal and the physical broadcast channel, the transmitting time number being used to indicate a corresponding transmitting time position of the beam in a transmittable time zone for the synchronization signal and the physical broadcast channel, the transmittable time zone comprising at least one transmitting time position corresponding to at least one beam;

sending information related to the transmitting time number to a terminal, for the terminal to determine a subframe boundary and complete time domain synchronization according to the information related to the transmitting time number and the pre-stored transmittable time zone.

Wherein, the step of sending information related to the transmitting time number to a terminal comprises:

configuring an amount of secondary synchronization signal sequence according to an amount of the beam, mapping the transmitting time number with the secondary synchronization signal sequence to get a mapping table, and sending the secondary synchronization signal sequence to the terminal, to allow the terminal to determine the transmitting time number by looking-up the pre-stored mapping table.

Wherein, the step of sending information related to the transmitting time number to a terminal comprises:

sending the transmitting time number as system information to the terminal through the physical broadcast channel.

Wherein, the step of sending information related to the transmitting time number to a terminal comprises:

configuring a reference signal corresponding to the beam, mapping the transmitting time number with the reference signal to get a mapping table, and sending the reference signal to the terminal, to allow the terminal to determine the transmitting time number by looking-up the pre-stored mapping table.

A second aspect of the embodiments of the present disclosure provides a synchronization method that comprises:

receiving, through a terminal, information related to a transmitting time number of a beam sent from a base station if the base station uses the beam to transmit a synchronization signal and a physical broadcast channel, the transmitting time number being used to indicate a corresponding transmitting time position of the beam in a transmittable time zone for the synchronization signal and the physical broadcast channel, the transmittable time zone comprising at least one transmitting time position corresponding to at least one beam;

determining a subframe boundary and completing time domain synchronization according to the information related to the transmitting time number and the pre-stored transmittable time zone.

Wherein, the step of the terminal receiving information related to a transmitting time number of a beam sent from a base station comprises:

receiving a secondary synchronization signal sequence sent from the base station, and determining the transmitting time number by looking-up a mapping table, based on the received secondary synchronization signal sequence in combination with the mapping table between a secondary synchronization signal sequence and a transmitting time number pre-stored in the terminal; or receiving system information sent from the base station through the physical broadcast channel, and determining the transmitting time number from the system information; or receiving a reference signal sent from the base station, and determining the transmitting time number by looking-up a mapping table, based on the received reference signal in combination with the mapping table between a reference signal and a transmitting time number pre-stored in the terminal, wherein the reference signal is configured by the base station and corresponds to the beam.

A third aspect of the embodiments of the present disclosure provides a base station that comprises:

a selecting unit, for selecting one subcarrier spacing from at least one preset subcarrier spacing for transmitting a synchronization signal and a physical broadcast channel according to service delay requirements;

a configuring unit, for configuring a transmitting time number of a beam if the base station uses the beam to transmit the synchronization signal and the physical broadcast channel, the transmitting time number being used to indicate a corresponding transmitting time position of the beam in a transmittable time zone for the synchronization signal and the physical broadcast channel, and the transmittable time zone comprising at least one transmitting time position corresponding to at least one beam;

a sending unit, for sending information related to the transmitting time number to a terminal, for the terminal to determine a subframe boundary and complete time domain synchronization according to the information related to the transmitting time number and the pre-stored transmittable time zone.

Wherein, the sending unit is particularly for configuring an amount of secondary synchronization signal sequence according to an amount of the beam, mapping the transmitting time number with the secondary synchronization signal sequence to get a mapping table, and sending the secondary synchronization signal sequence to the terminal, to allow the terminal to determine the transmitting time number by looking-up the pre-stored mapping table.

Wherein, the sending unit is particularly for sending the transmitting time number as system information to the terminal through the physical broadcast channel.

Wherein, the sending unit is particularly for configuring a reference signal corresponding to the beam, mapping the transmitting time number with the reference signal to get a mapping table, and sending the reference signal to the terminal, to allow the terminal to determine the transmitting time number by looking-up the pre-stored mapping table.

A fourth aspect of the embodiments of the present disclosure provides a base station that comprises:

a processor, a memory, a transceiver and a bus, wherein, the processor, the memory and the transceiver are interconnected by the bus, the transceiver is used for transmit information and data between the base station and a terminal, the memory is used for storing a set of program codes, and the processor is used for calling the program codes stored in the memory to execute the following operation steps:

selecting one subcarrier spacing from at least one preset subcarrier spacing for transmitting a synchronization signal and a physical broadcast channel according to service delay requirements;

configuring a transmitting time number of a beam if the base station uses the beam to transmit the synchronization signal and the physical broadcast channel, the transmitting time number being used to indicate a corresponding transmitting time position of the beam in a transmittable time zone for the synchronization signal and the physical broadcast channel, the transmittable time zone comprising at least one transmitting time position corresponding to at least one beam;

sending information related to the transmitting time number to a terminal by using the transceiver, for the terminal to determine a subframe boundary and complete time domain synchronization according to the information related to the transmitting time number and the pre-stored transmittable time zone.

Wherein, the processor is particularly for calling the program code stored in the memory to execute:

configuring an amount of secondary synchronization signal sequence according to an amount of the beam, mapping the transmitting time number with the secondary synchronization signal sequence to get a mapping table, and sending the secondary synchronization signal sequence to the terminal, to allow the terminal to determine the transmitting time number by looking-up the pre-stored mapping table.

Wherein, the processor is particularly for calling the program code stored in the memory to execute:

sending the transmitting time number as system information to the terminal through the physical broadcast channel.

Wherein, the processor is particularly for calling the program code stored in the memory to execute:

configuring a reference signal corresponding to the beam, mapping the transmitting time number with the reference signal to get a mapping table, and sending the reference signal to the terminal, to allow the terminal to determine the transmitting time number by looking-up the pre-stored mapping table.

A fifth aspect of the embodiments of the present disclosure provides a terminal that comprises:

a receiving unit, for receiving information related to a transmitting time number of a beam sent from a base station if the base station uses the beam to transmit a synchronization signal and a physical broadcast channel, the transmitting time number being used to indicate a corresponding transmitting time position of the beam in a transmittable time zone for the synchronization signal and the physical broadcast channel, the transmittable time zone comprising at least one transmitting time position corresponding to at least one beam;

a synchronizing unit, for determining a subframe boundary and complete time domain synchronization according to the information related to the transmitting time number and the transmittable time zone pre-stored in the terminal.

Wherein, the receiving unit is particularly for receiving a secondary synchronization signal sequence sent from the base station, and determining the transmitting time number by looking-up a mapping table, based on the received secondary synchronization signal sequence in combination with the mapping table between a secondary synchronization signal sequence and a transmitting time number pre-stored in the terminal; or receiving system information sent from the base station through the physical broadcast channel, and determining the transmitting time number from the system information; or receiving a reference signal sent from the base station, and determining the transmitting time number by looking-up a mapping table, based on the reference signal in combination with the mapping table between a reference signal and a transmitting time number pre-stored in the terminal, wherein the reference signal is configured by the base station and corresponds to the beam.

A sixth aspect of the embodiments of the present disclosure provides a terminal that comprises:

a processor, a memory, an interface circuit and a bus, wherein, the processor, the memory and the interface circuit are interconnected by the bus, the memory is used for storing a set of program codes, and the processor is used for calling the program codes stored in the memory to execute the following operation steps:

receiving information related to a transmitting time number of a beam sent from a base station if the base station uses the beam to transmit a synchronization signal and a physical broadcast channel, the transmitting time number being used to indicate a corresponding transmitting time position of the beam in a transmittable time zone for the synchronization signal and the physical broadcast channel, the transmittable time zone comprising at least one transmitting time position corresponding to at least one beam;

determining a subframe boundary and completing time domain synchronization according to the information related to the transmitting time number and the pre-stored transmittable time zone.

Wherein, the processor is particularly for calling the program code stored in the memory to execute:

receiving a secondary synchronization signal sequence sent from the base station, and determining the transmitting time number by looking-up a mapping table, based on the received secondary synchronization signal sequence in combination with the mapping table between a secondary synchronization signal sequence and a transmitting time number pre-stored in the terminal; or receiving system information sent from the base station through the physical broadcast channel, and determining the transmitting time number from the system information; or receiving a reference signal sent from the base station, and determining the transmitting time number by looking-up a mapping table, based on the reference signal in combination with the mapping table between a reference signal and a transmitting time number pre-stored in the terminal, wherein the reference signal is configured by the base station and corresponds to the beam.

BRIEF DESCRIPTION OF THE DRAWINGS

In order to more clearly describe the technical solutions in the embodiments of the present disclosure or in the prior art, hereinafter, the accompanying drawings required to be used for describing the embodiments or the prior art will be briefly introduced. Apparently, the accompanying drawings described below are only directed to some embodiments of the present disclosure, and for a person skilled in the art, without expenditure of creative labor, other drawings can be derived on the basis of these accompanying drawings.

DETAILED DESCRIPTION

A clear and complete description of the technical solutions of the embodiments of the present disclosure is given below, in conjunction with the accompanying drawings. Apparently, the embodiments described below are part of, but not all of, the embodiments of the present disclosure. All the other embodiments, obtained by a person skilled in the art on the basis of the embodiments described in the present disclosure without expenditure of creative labor, belong to the protection scope of the present disclosure.

Figure 1:
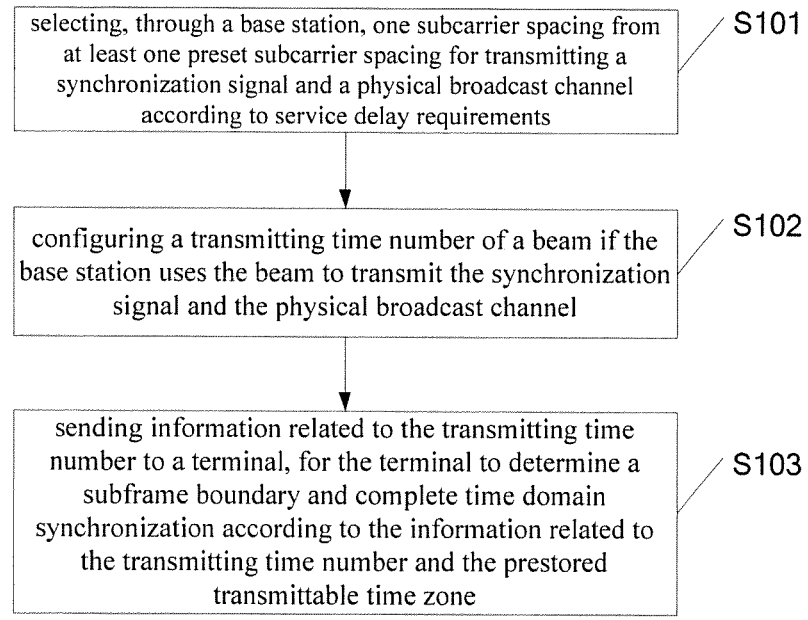
FIG. 1 is a flow chart of a first embodiment of the information transmission method of the present disclosure.

Referring to FIG. 1 which is a flow chart of a first embodiment of the information transmission method of the present disclosure, in this embodiment, the method comprises the following steps:

S101, selecting, through a base station, one subcarrier spacing from at least one preset subcarrier spacing for transmitting a synchronization signal and a physical broadcast channel according to service delay requirements.

In order to meet different delay requirements of different services, the base station may configure at least one type of subcarrier spacing and occupied symbol number in relation to a synchronization signal and configure at least one type of subcarrier spacing and occupied symbol number in relation to a physical broadcast channel.

For example, the subcarrier spacing of the synchronization signal may be configured to be $15 \times 2^m$ kHz, the subcarrier spacing of the physical broadcast channel may be configured to be $15 \times 2^n$ kHz, where m and n are both integers in a range of 0 to 5; m may be equal to n, or m may be smaller than n.

The information contained in the PBCH (Physical Broadcast Channel) includes system information such as MIB (Master Information Block) and random access information.

Specifically, the synchronization signal comprises PSS (Primary Synchronization Signal) and SSS (Secondary Synchronization Signal), the Primary Synchronization Signal occupies one symbol, the Secondary Synchronization Signal occupies one symbol.

Wherein, the symbol occupied by the Secondary Synchronization Signal is a preceding and neighboring symbol of the symbol occupied by the Primary Synchronization Signal;

or the symbol occupied by the Secondary Synchronization Signal is the same symbol occupied by the Primary Synchronization Signal. For example, the SSS occupies the 6th symbol in the subframe-0, and the PSS occupies the 7th symbol in the sub-frame 0; or, the SSS and PSS both occupy the 6th symbol or the 7th symbol.

The physical broadcast channel occupies no more than 4 symbols, a starting symbol of the time domain for sending the physical broadcast channel is the $x^{th}$ symbol after the symbol for sending the Secondary Synchronization Signal, where x is 0 or 1.

The lengths of symbol units occupied by the Primary Synchronization Signal, the Secondary Synchronization Signal and the physical broadcast channel are determined by the subcarrier spacing setting that has been configured, and if the subcarrier spacing of the Primary Synchronization Signal and Secondary Synchronization Signal is $15 \times 2^m$ kHz, the length of the symbol unit occupied by the Primary Synchronization Signal and Secondary Synchronization Signal is $1/(14 \times 2^m)$ milliseconds; if the subcarrier spacing of the physical broadcast channel is $15 \times 2^n$ kHz, the length of the symbol unit occupied by the physical broadcast channel is $1/(14 \times 2^n)$ milliseconds.

It should be noted that, the above-mentioned one symbol occupied by the PSS/SSS and the above-mentioned 4 symbols occupied by the PBCH refer to one PSS/SSS sending block and one PBCH sending block. One sending burst may contain multiple PSS/SSS sending blocks and multiple PBCH sending blocks, wherein, each PSS/SSS sending block is able to individually perform a function of sending PSS/SSS, and each PBCH sending block is able to individually perform a function of sending PBCH.

Because there may exist multiple carrier frequencies used by the base station, the base station can configure at least one type of subcarrier spacing of a synchronization signal and a physical broadcast channel, and at least one type of symbol number respectively occupied by the synchronization signal and the physical broadcast channel, for each carrier frequency.

For some services with higher requirements on time delay, a terminal is required to have access to a cell quickly. For some other services with lower requirements on time delay, slower processing can be adopted. Accordingly, the base station can select one suitable setting from multiple settings for sending the synchronization signal and the physical broadcast channel according to the particular service delay requirement, so as to meet the requirements of different terminals.

S102, configuring a transmitting time number of a beam if the base station uses the beam to transmit the synchronization signal and the physical broadcast channel.

The transmitting time number is used to indicate a corresponding transmitting time position of the beam in a transmittable time zone for the synchronization signal and the physical broadcast channel, the transmittable time zone comprises at least one transmitting time position corresponding to at least one beam.

Figure 2:
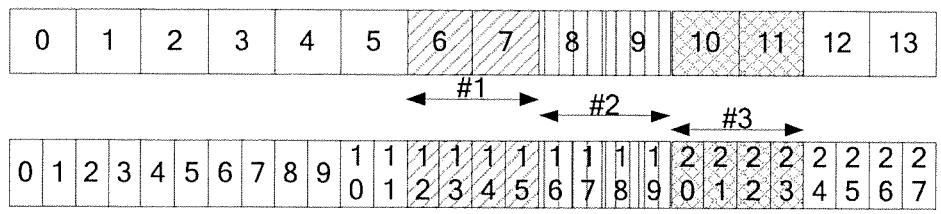
FIG. 2 is a time domain schematic view corresponding to transmitting time numbers under different subcarrier spacing settings in the information transmission method of the present disclosure.

For example, as shown in FIG. 2 which is a time domain schematic view corresponding to transmitting time numbers under different subcarrier spacing settings in the information transmission method of the present disclosure, wherein, subframe-1 is a 1 ms subframe, the subcarrier spacing is 15 KHz, one subframe contains 14 symbols, wherein, the symbol-6 and symbol-7 with oblique stripes are the transmitting time position corresponding to beam-1, the symbol-8 and symbol-9 with vertical stripes are the transmitting time position corresponding to beam-2, the symbol-10 and symbol-11 with grid stripes are the transmitting time position corresponding to beam-3, and these six symbols compose a transmittable time zone (the transmittable time zone may also be composed of multiple discontinuous transmitting time positions). Each symbol occupies $1/14$ ms, the beam-1 starts to send the synchronization signal and the physical broadcast channel at the point of $6/14$ ms. Because the terminal only knows the beam is in a transmittable time zone when receiving the synchronization signal and PBCH sent on the beam, but the terminal cannot determine which one of the beams it is or where is the specific transmitting time position, the terminal thus cannot exactly determine a subframe boundary and perform time domain synchronization. Therefore, the present disclosure introduces the transmitting time number which can indicate the corresponding transmitting time position of the beam in the transmittable time zone for the synchronization signal and the physical broadcast channel. When the terminal acquires the transmitting time number, the terminal can then exactly determine a subframe boundary and perform time domain synchronization according to a specific transmitting time position indicated by the transmitting time number. Similarly, as shown in FIG. 2, subframe-2 is a 1 ms subframe, the subcarrier spacing is 30 KHz, one subframe contains 28 symbols, and although the number of symbols and the serial-number thereof occupied by every beam are different, the specific transmitting time starting point may still be the same as in the subframe-1. For example, in the subframe-2, the symbol-12, symbol-13, symbol-14 and symbol-15 with oblique stripes are the transmitting time position corresponding to beam-1, the symbol-16, symbol-17, symbol-18 and symbol-19 with vertical stripes are the transmitting time position corresponding to beam-2, the symbol-20, symbol-21, symbol-22 and symbol-23 with grid stripes are the transmitting time position corresponding to beam-3, and a total of twelve symbols compose a transmittable time zone. Each symbol occupies $1/18$ ms, the beam-1 starts to send the synchronization signal and the physical broadcast channel at the point of $12/28$ ms which is the same as the transmitting time starting point of beam-1 in the subframe-1. The transmitting time period occupied by every beam in the subframe-2 shown in FIG. 2 is 4 symbols, but in other examples, when the subcarrier spacing is 30 KHz, the transmitting time period occupied by every beam may also be 2 symbols.

Optionally, the time domain positions for sending the synchronization signal and the physical broadcast channel are neighboring each other or partially identical.

That is to say, for time domain, neighboring time domain positions or partially identical time domain position are selected for sending the synchronization signal and the physical broadcast channel of the same beam.

Optionally, the time domain transmitting positions for sending the synchronization signal and the physical broadcast channel on different carrier frequencies overlap or partially overlap to the greatest extent.

Specifically, as the subcarrier spacing settings used by the synchronization signal and the physical broadcast channel are different, the corresponding occupied symbol lengths are different. For time domain positions, it may be configured that the transmitting time starting points are the same, and because different symbol lengths lead to different transmitting time lengths, the transmitting time finishing points are different. For example, in the subframe-1, as for the PSS, SSS and PBCH sent in the subframe-1, when the subcarrier spacing is 15 kHz, the subframe-1 of 1 ms contains 14 symbols. Provided that a transmission block composed of the PSS, SSS and PBCH is transmitted in the four symbols of symbol-6, symbol-7, symbol-8 and symbol-9, the transmitting time length is $4/14$ ms, and the transmitting time starting point is at the point of $6/14$ ms. If the base station selects another subcarrier spacing setting for sending these information, because the subcarrier spacing changes to 30 kHz, the subframe-1 contains 28 symbols, each symbol occupies $1/28$ ms, under such conditions, the transmission block composed of the PSS, SSS and PBCH also starts to be transmitted at the point of $6/14$ ms, i.e. the point of $12/28$ ms, and it also occupies 4 symbols for transmission, i.e. the transmission is done in the four symbols of symbol-12, symbol-13, symbol-14 and symbol-15, but because the symbol length shortens with unchanged number of symbols, the transmitting time length changes to $4/28$ ms. Therefore, under different subcarrier spacing settings, the transmission may be started at the same transmitting time starting point but finished at different transmitting time finishing points. And because the transmitting time length shortens, the time delay for the terminal to search for, synchronize with and access a cell is reduced. The transmitting time periods of PSS, SSS and PBCH sent under different subcarrier spacing settings overlap to the greatest extent such that the shortest transmitting time period is included within the longer transmitting time periods, which helps the terminal perform detection. The time delay thereof can be greatly reduced by means of the time overlap.

Or, similarly, the following modes can be used:
the transmitting time finishing points are the same, with different transmitting time starting points; or
the transmitting time middle points are the same, with different transmitting time starting points and transmitting time finishing points; for example, the middle time point is the 0.5 ms point of a 1 ms subframe, and if the transmitting time length is 0.2 ms, the transmitting time starting point is the 0.4 ms point and the transmitting time finishing point is the 0.6 ms point; if the transmitting time length is 0.1 ms, the transmitting time starting point is the 0.45 ms point and the transmitting time finishing point is the 0.55 ms point.

Or, based on a 0.5 ms time point in a 1 ms subframe, the Secondary Synchronization Signal occupies one preceding symbol adjacent to the 0.5 ms time point, and the Primary Synchronization Signal occupies one subsequent symbol adjacent to the 0.5 ms time point.

The above-mentioned time domain overlapping modes have similar principles, the only differences are their specific overlapping positions, which are not redundantly described herein.

S103, sending information related to the transmitting time number to a terminal, for the terminal to determine a subframe boundary and complete time domain synchronization according to the information related to the transmitting time number and the pre-stored transmittable time zone.

Optionally, if the synchronization signal and the physical broadcast channel are sent by using multiple beams, each of the beams performs information transmission independently, the frequency domain positions and time domain positions for each beam may be different, or may be the same, which is not restricted in any way by the embodiments of the present disclosure.

If at least two beams use different time domain positions to transmit information, the serial-number corresponding to the transmitting time position of each beam is determined; and when each beam transmits information, the information related to the serial-number of the transmitting time position of the beam is carried in the transmission.

This is because, if the PSS/SSS/PBCH is sent on multiple beams, and the multiple beams perform transmission at different time periods, for example, the multiple beams are distributed in several consecutive symbols of a subframe, then, a user in one direction can only receive the PSS/SSS/PBCH sent on one of the beams, and if the user does not know in which symbol this beam is sent, then the user cannot determine a subframe boundary. Therefore, when the PSS/SSS/PBCH is sent on multiple beams, each beam should identify which one of the beams it is, so that the user, knowing the transmitting symbol position of the first beam transmitting the PSS/SSS/PBCH as well as the transmitting time length of every beam transmitting the PSS/SSS/PBCH, can deduce the symbol position of the PSS/SSS/PBCH of the beam received by the user, and thus, the subframe boundary can be further calculated, thereby achieving subframe synchronization.

Optionally, in order to allow the terminal to acquire the transmitting time number, the following three ways may be used:

The base station may configure an amount of secondary synchronization signal sequence according to an amount of the beam, map the transmitting time number with the secondary synchronization signal sequence to get a mapping table, and send the secondary synchronization signal sequence to the terminal, so as to allow the terminal to determine the transmitting time number by looking-up the pre-stored mapping table.

It should be noted that, as LTE already has two SSS sequences for indicating the subframe #0 and subframe #5, when there are only two beams and if different SSS sequences do not need to indicate different subframes or symbol positions and only need to indicate the beams, there would be no need to configure new SSS sequences; however, if they need to indicate different subframes or symbol positions, or if they need to indicate three or more beams, more different SSS sequences would be configured. That is to say, the SSS sequences may be used to indicate a combination of one or more from different subframes, different symbols and different beams, and the amount of SSS sequences should be determined comprehensively according to the features that need to be indicated by the SSS sequences.

Or, the base station may send the transmitting time number as system information to the terminal through the physical broadcast channel. That is to say, the transmitting time numbers of different beams are sent in the physical broadcast channel as system information. Herein, because the beam transmitting time number is directly carried, an additional mapping table is not needed.

Or, the base station may configure a RS (Reference Signal) corresponding to the beam, map the transmitting time number with the Reference Signal to get a mapping table, and send the Reference Signal to the terminal, so as to allow the terminal to determine the transmitting time number by looking-up the pre-stored mapping table.

It should be noted that, the RS corresponding to the beam herein may be a newly designed RS different from the existing RS, or may be the existing CSI-RS (Channel State Indication RS).

In this embodiment, by configuring multiple subcarrier spacing settings to be selected from, the flexibility of response can be improved when facing different services, and the resource utilization flexibility can be improved; using beams to send synchronization signals and physical broadcast channel can increase the signal coverage area, and by configuring a transmitting time number for each beam and sending the information related to the transmitting time number to a terminal, the terminal can determine a specific transmitting time position of the beam according to the information of the transmitting time number, so that a subframe boundary can be exactly determined and time domain synchronization can be completed, thereby bringing better using experience for users.

Figure 3:
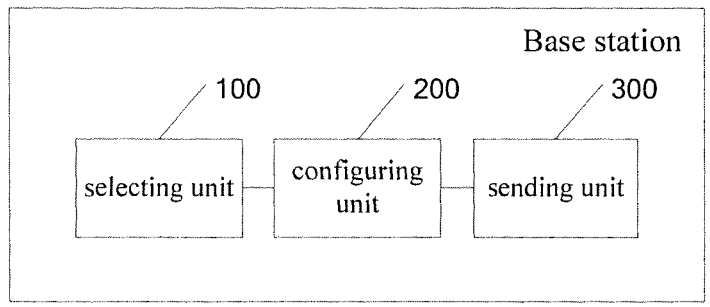
FIG. 3 is a composition diagram of a first embodiment of the base station of the present disclosure.

Referring to FIG. 3 which is a composition diagram of a first embodiment of the base station of the present disclosure, in this embodiment, the base station comprises:
- a selecting unit 100, for selecting one subcarrier spacing from at least one preset subcarrier spacing for transmitting a synchronization signal and a physical broadcast channel according to service delay requirements;
- a configuring unit 200, for configuring a transmitting time number of a beam if the base station uses the beam to transmit the synchronization signal and the physical broadcast channel, the transmitting time number being used to indicate a corresponding transmitting time position of the beam in a transmittable time zone for the synchronization signal and the physical broadcast channel, and the transmittable time zone comprising at least one transmitting time position corresponding to at least one beam;
- a sending unit 300, for sending information related to the transmitting time number to a terminal, for the terminal to determine a subframe boundary and complete time domain synchronization according to the information related to the transmitting time number and the pre-stored transmittable time zone.

Optionally, the sending unit 300 is particularly for configuring an amount of secondary synchronization signal sequence according to an amount of the beam, mapping the transmitting time number with the secondary synchronization signal sequence to get a mapping table, and sending the secondary synchronization signal sequence to the terminal, to allow the terminal to determine the transmitting time number by looking-up the pre-stored mapping table.

Optionally, the sending unit 300 is particularly for sending the transmitting time number as system information to the terminal through the physical broadcast channel.

Optionally, the sending unit 300 is particularly for configuring a reference signal corresponding to the beam, mapping the transmitting time number with the reference signal to get a mapping table, and sending the reference signal to the terminal, to allow the terminal to determine the transmitting time number by looking-up the pre-stored mapping table.

The above described selecting unit 100, configuring unit 200 and sending unit 300 may exist individually or may be integrated together. The selecting unit 100, configuring unit 200 or sending unit 300 may be provided in hardware form independently from the processor of the base station, as an individual microprocessor; they may also be embedded in hardware form within the processor of the base station, or may be stored in software form within the processor of the base station, so as to make it convenient for the processor of the base station to call and execute the operation steps corresponding to the selecting unit 100, configuring unit 200 and sending unit 300.

For example, in the first embodiment of the base station of the present disclosure (the embodiment shown in FIG. 3), the configuring unit 200 may be a processor of the base station, the function of the selecting unit 100 and sending unit 300 may be embedded within the processor, or may be provided independently from the processor, or may be stored in software form within the processor for the processor to call and execute their function, which is not restricted in any way by the embodiments of the present disclosure. The above described processor may be a CPU (Central Processing Unit), a microprocessor or a single chip microcomputer.

Figure 4:
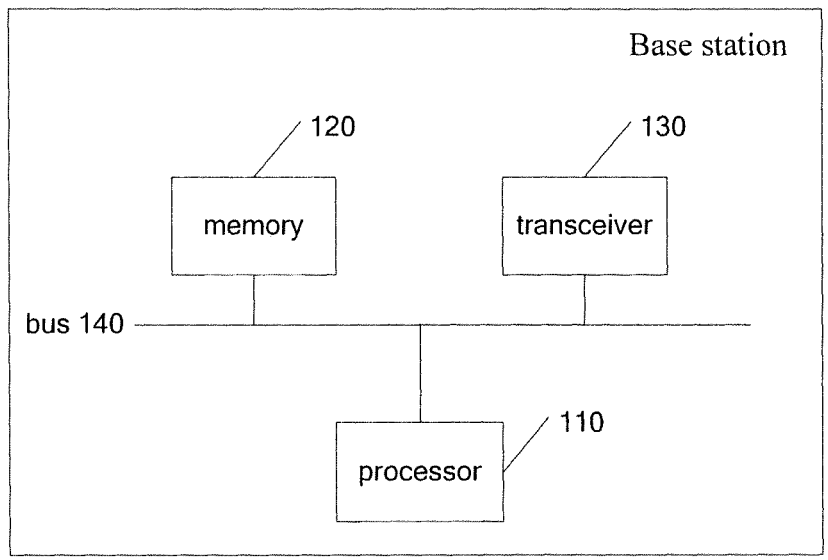
FIG. 4 is a composition diagram of a second embodiment of the base station of the present disclosure.

Referring to FIG. 4 which is a composition diagram of a second embodiment of the base station of the present disclosure, in this embodiment, the base station comprises:
- a processor 110, a memory 120, a transceiver 130 and a bus 140, wherein, the processor 110, the memory 120 and the transceiver 130 are interconnected by the bus 140, the transceiver 130 is used for transmit information and data between the base station and a terminal, the memory 120 is used for storing a set of program codes, and the processor 110 is used for calling the program codes stored in the memory 120 to execute the following operation steps:
- selecting one subcarrier spacing from at least one preset subcarrier spacing for transmitting a synchronization signal and a physical broadcast channel according to service delay requirements;
- configuring a transmitting time number of a beam if the base station uses the beam to transmit the synchronization signal and the physical broadcast channel, the transmitting time number being used to indicate a corresponding transmitting time position of the beam in a transmittable time zone for the synchronization signal and the physical broadcast channel, the transmittable time zone comprising at least one transmitting time position corresponding to at least one beam;
- sending information related to the transmitting time number to a terminal by using the transceiver 130, for the terminal to determine a subframe boundary and complete time domain synchronization according to the information related to the transmitting time number and the pre-stored transmittable time zone.

The processor 110 is particularly for calling the program code stored in the memory to execute:

configuring an amount of secondary synchronization signal sequence according to an amount of the beam, mapping the transmitting time number with the secondary synchronization signal sequence to get a mapping table, and sending the secondary synchronization signal sequence to the terminal, to allow the terminal to determine the transmitting time number by looking-up the pre-stored mapping table.

Optionally, the processor 110 is particularly for calling the program code stored in the memory to execute:

sending the transmitting time number as system information to the terminal through the physical broadcast channel.

Optionally, the processor 110 is particularly for calling the program code stored in the memory to execute:

configuring a reference signal corresponding to the beam, mapping the transmitting time number with the reference signal to get a mapping table, and sending the reference signal to the terminal, to allow the terminal to determine the transmitting time number by looking-up the pre-stored mapping table.

Figure 5:
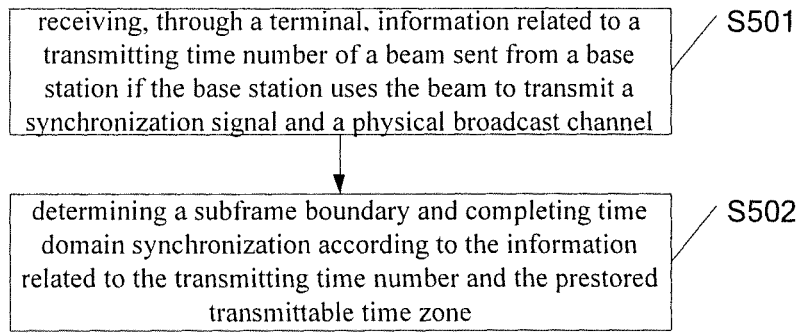
FIG. 5 is a flow chart of a first embodiment of the synchronization method of the present disclosure.

Referring to FIG. 5 which is a flow chart of a first embodiment of the synchronization method of the present disclosure, in this embodiment, the method comprises the following steps:

S501, receiving, through a terminal, information related to a transmitting time number of a beam sent from a base station if the base station uses the beam to transmit a synchronization signal and a physical broadcast channel.

Wherein, the transmitting time number is used to indicate a corresponding transmitting time position of the beam in a transmittable time zone for the synchronization signal and the physical broadcast channel, the transmittable time zone comprises at least one transmitting time position corresponding to at least one beam.

S502, determining a subframe boundary and completing time domain synchronization according to the information related to the transmitting time number and the pre-stored transmittable time zone.

Optionally, the step of the terminal receiving information related to a transmitting time number of a beam sent from a base station comprises:

receiving a secondary synchronization signal sequence sent from the base station, and determining the transmitting time number by looking-up a mapping table, based on the received secondary synchronization signal sequence in combination with the mapping table between a secondary synchronization signal sequence and a transmitting time number pre-stored in the terminal; or receiving system information sent from the base station through the physical broadcast channel, and determining the transmitting time number from the system information; or receiving a reference signal sent from the base station, and determining the transmitting time number by looking-up a mapping table, based on the received reference signal in combination with the mapping table between a reference signal and a transmitting time number pre-stored in the terminal, wherein the reference signal is configured by the base station and corresponds to the beam.

Because the base station has configured multiple settings of subcarrier spacing and occupied symbol number, the particular settings can be flexibly selected according to the service for the terminal, and the synchronization signal and the physical broadcast channel are sent closely to each other, it is beneficial for the terminal to search for, synchronize with and access a cell, the processing delay of the terminal is reduced, and the efficiency of the terminal accessing the cell is increased.

Figure 6:
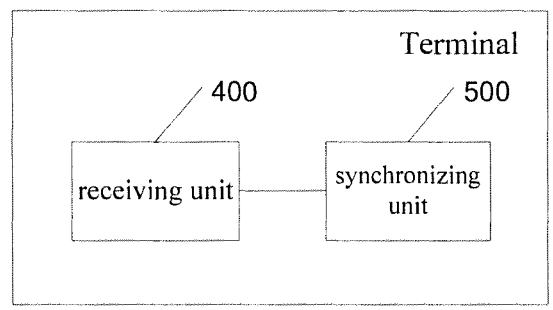
FIG. 6 is a composition diagram of a first embodiment of the terminal of the present disclosure.

Referring to FIG. 6 which is a composition diagram of a first embodiment of the terminal of the present disclosure, in this embodiment, the terminal comprises:

a receiving unit 400, for receiving information related to a transmitting time number of a beam sent from a base station if the base station uses the beam to transmit a synchronization signal and a physical broadcast channel, the transmitting time number being used to indicate a corresponding transmitting time position of the beam in a transmittable time zone for the synchronization signal and the physical broadcast channel, the transmittable time zone comprising at least one transmitting time position corresponding to at least one beam;

a synchronizing unit 500, for determining a subframe boundary and complete time domain synchronization according to the information related to the transmitting time number and the transmittable time zone pre-stored in the terminal.

The above described receiving unit 400 and synchronizing unit 500 may exist individually or may be integrated together. The receiving unit 400 or synchronizing unit 500 may be provided in hardware form independently from the processor of the terminal, as an individual microprocessor; they may also be embedded in hardware form within the processor of the terminal, or may be stored in software form within the processor of the terminal, so as to make it convenient for the processor of the terminal to call and execute the operation steps corresponding to the receiving unit 400 and synchronizing unit 500.

For example, in the first embodiment of the terminal of the present disclosure (the embodiment shown in FIG. 6), the synchronizing unit 500 may be a processor of the terminal, the function of the receiving unit 400 may be embedded within the processor, or may be provided independently from the processor, or may be stored in software form within the processor for the processor to call and execute its function, which is not restricted in any way by the embodiments of the present disclosure. The above described processor may be a CPU (Central Processing Unit), a microprocessor or a single chip microcomputer.

Figure 7:
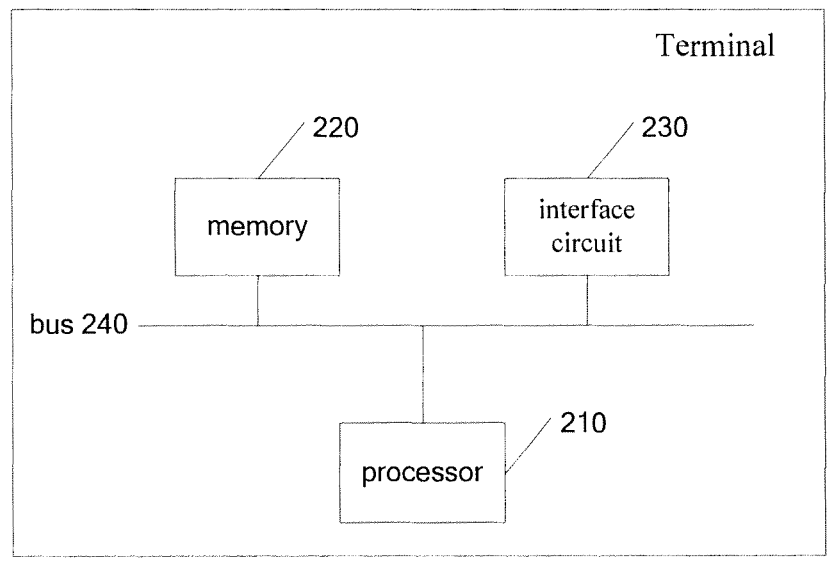
FIG. 7 is a composition diagram of a second embodiment of the terminal of the present disclosure.

Referring to FIG. 7 which is a composition diagram of a second embodiment of the terminal of the present disclosure, in this embodiment, the terminal comprises:

a processor 210, a memory 220, an interface circuit 230 and a bus 240, wherein, the processor 210, the memory 220 and the interface circuit 230 are interconnected by the bus 240, the memory 220 is used for storing a set of program codes, and the processor 210 is used for calling the program codes stored in the memory 220 to execute the following operation steps:

receiving information related to a transmitting time number of a beam sent from a base station if the base station uses the beam to transmit a synchronization signal and a physical broadcast channel, the transmitting time number being used to indicate a corresponding transmitting time position of the beam in a transmittable time zone for the synchronization signal and the physical broadcast channel, the transmittable time zone comprising at least one transmitting time position corresponding to at least one beam;

determining a subframe boundary and completing time domain synchronization according to the information related to the transmitting time number and the prestored transmittable time zone.

Wherein, the processor 210 is particularly for calling the program code stored in the memory to execute:

receiving a secondary synchronization signal sequence sent from the base station, and determining the transmitting time number by looking-up a mapping table, based on the received secondary synchronization signal sequence in combination with the mapping table between a secondary synchronization signal sequence and a transmitting time number pre-stored in the terminal; or receiving system information sent from the base station through the physical broadcast channel, and determining the transmitting time number from the system information; or receiving a reference signal sent from the base station, and determining the transmitting time number by looking-up a mapping table, based on the reference signal in combination with the mapping table between a reference signal and a transmitting time number prestored in the terminal, wherein the reference signal is configured by the base station and corresponds to the beam.

It should be noted that, the respective embodiments in the present Specification are described in an incremental way wherein a subsequently described embodiment focuses on the difference as compared to a previously described embodiment, and the identical or similar parts of the embodiments can be mutually referred to. For a device embodiment, because it is basically similar to a corresponding method embodiment, it is described in a relatively simple way, and the related parts can refer to the corresponding parts described in the method embodiment.

As can be seen from the above description of the embodiments, the present disclosure has the following advantages:

By configuring multiple subcarrier spacing settings to be selected from, the flexibility of response can be improved when facing different services, and the resource utilization flexibility can be improved; using beams to send synchronization signals and physical broadcast channel can increase the signal coverage area, and by configuring a transmitting time number for each beam and sending the information related to the transmitting time number to a terminal, the terminal can determine a specific transmitting time position of the beam according to the information of the transmitting time number, so that a subframe boundary can be exactly determined and time domain synchronization can be completed, thereby bringing better using experience for users.

As can be understood by a person skilled in the art, all of or part of the steps in the above-described method embodiments can be implemented by related hardware with instructions of a computer program, the program can be stored in a computer readable storage medium, and when the program is executed, it performs the above-mentioned steps of the above-described method embodiments. Wherein, the storage medium may be a magnetic disk, an optic disk, a ROM (Read-Only Memory) or a RAM (Random Access Memory).

The above disclosed is only preferred embodiments of the present disclosure, which is not intended for limiting the claim scope of the present disclosure, therefore, any equivalent variants based on the Claims of the present disclosure still belong to the protection scope covered by the present disclosure.

The invention claimed is:

1. An information transmission method for a base station comprising:
   selecting one subcarrier spacing from at least one preset subcarrier spacing for transmitting a synchronization signal and a physical broadcast channel according to service delay requirements;
   configuring a transmitting time number of a beam when the base station uses the beam to transmit the synchronization signal and the physical broadcast channel, the transmitting time number being used to indicate a corresponding transmitting time position of the beam in a transmittable time zone for the synchronization signal and the physical broadcast channel, the transmittable time zone comprising at least one transmitting time position corresponding to at least one beam; and
   sending information related to the transmitting time number to a terminal for the terminal to determine a subframe boundary and complete time domain synchronization according to the information related to the transmitting time number and the prestored transmittable time zone.

2. The method according to claim 1, wherein the step of sending information related to the transmitting time number to the terminal further comprises:
   configuring an amount of secondary synchronization signal sequence according to an amount of the beam,
   mapping the transmitting time number with the secondary synchronization signal sequence to get a pre-stored mapping table, and
   sending the secondary synchronization signal sequence to the terminal, to allow the terminal to determine the transmitting time number by looking-up the pre: stored mapping table.

3. The method according to claim 1, wherein the step of sending information related to the transmitting time number to the terminal further comprises:
   sending the transmitting time number as system information to the terminal through the physical broadcast channel.

4. The method according to claim 1, wherein the step of sending information related to the transmitting time number to the terminal further comprises:
   configuring a reference signal corresponding to the beam,
   mapping the transmitting time number with the reference signal to get a mapping table, and
   sending the reference signal to the terminal to allow the terminal to determine the transmitting time number by looking-up the prestored mapping table.

5. A synchronization method for a terminal comprising:
   receiving information related to a transmitting time number of a beam sent from a base station when the base station uses the beam to transmit a synchronization signal and a physical broadcast channel, the transmitting time number being used to indicate a corresponding transmitting time position of the beam in a pre-stored transmittable time zone for the synchronization signal and the physical broadcast channel, the transmittable time zone comprising at least one transmitting time position corresponding to at least one beam; and
   determining a subframe boundary and completing time domain synchronization according to the information related to the transmitting time number and the pre: stored transmittable time zone.

6. The method according to claim 5, wherein the step of the terminal receiving information related to a transmitting time number of a beam sent from the base station further comprises:

receiving a secondary synchronization signal sequence sent from the base station, and determining the transmitting time number by looking-up a mapping table, based on the received secondary synchronization signal sequence in combination with the mapping table between a secondary synchronization signal sequence and a transmitting time number prestored in the terminal; or receiving system information sent from the base station through the physical broadcast channel, and determining the transmitting time number from the system information; or receiving a reference signal sent from the base station, and determining the transmitting time number by looking-up a mapping table, based on the received reference signal in combination with the mapping table between a reference signal and a transmitting time number prestored in the terminal, wherein the reference signal is configured by the base station and corresponds to the beam.

7. A base station comprising: a processor, a memory, a transceiver and a bus, wherein the processor, the memory and the transceiver are interconnected by the bus, the transceiver is used for transmitting information and data between the base station and a terminal, the memory is used for storing a set of program code, and the processor is used for calling the program code stored in the memory to execute:

selecting one subcarrier spacing from at least one preset subcarrier spacing for transmitting a synchronization signal and a physical broadcast channel according to service delay requirements;

configuring a transmitting time number of a beam when the base station uses the beam to transmit the synchronization signal and the physical broadcast channel, the transmitting time number being used to indicate a corresponding transmitting time position of the beam in a pre-stored transmittable time zone for the synchronization signal and the physical broadcast channel, and the transmittable time zone comprising at least one transmitting time position corresponding to at least one beam; and sending information related to the transmitting time number to a terminal, for the terminal to determine a subframe boundary and complete time domain synchronization according to the information related to the transmitting time number and the pre-stored transmittable time zone.

8. The base station according to claim 7, wherein the processor further calls the program code stored in the memory to execute:

configuring an amount of secondary synchronization signal sequence according to an amount of the beam, mapping the transmitting time number with the secondary synchronization signal sequence to get a pre-stored mapping table, and sending the secondary synchronization signal sequence to the terminal, to allow the terminal to determine the transmitting time number by looking-up the pre-stored mapping table.

9. The base station according to claim 7, wherein the processor further calls the program code stored in the memory to execute:

sending the transmitting time number as system information to the terminal through the physical broadcast channel.

10. The base station according to claim 7, wherein the processor further calls the program code stored in the memory to execute:

configuring a reference signal corresponding to the beam, mapping the transmitting time number with the reference signal to get a pre-stored mapping table, and sending the reference signal to the terminal, to allow the terminal to determine the transmitting time number by looking-up the pre: stored mapping table.

11. A terminal comprising: a processor, a memory, an interface circuit and a bus, wherein the processor, the memory and the interface circuit are interconnected by the bus, the memory is used for storing a set of program code, and the processor is used for calling the program code stored in the memory to execute:

receiving information related to a transmitting time number of a beam sent from a base station when the base station uses the beam to transmit a synchronization signal and a physical broadcast channel, the transmitting time number being used to indicate a corresponding transmitting time position of the beam in a pre-stored transmittable time zone for the synchronization signal and the physical broadcast channel, the transmittable time zone comprising at least one transmitting time position corresponding to at least one beam; and determining a subframe boundary and complete time domain synchronization according to the information related to the transmitting time number and the pre: stored transmittable time zone.

12. The terminal according to claim 11, wherein the processor further calls the program code stored in the memory to execute:

receiving a secondary synchronization signal sequence sent from the base station, and determining the transmitting time number by looking-up a mapping table, based on the received secondary synchronization signal sequence in combination with the mapping table between a secondary synchronization signal sequence and a transmitting time number prestored in the terminal; or receiving system information sent from the base station through the physical broadcast channel, and determining the transmitting time number from the system information; or receiving a reference signal sent from the base station, and determining the transmitting time number by looking-up a mapping table, based on the reference signal in combination with the mapping table between a reference signal and a transmitting time number prestored in the terminal, wherein the reference signal is configured by the base station and corresponds to the beam.

* * * * *